United States Patent [19]

Di Bernardo et al.

[11] Patent Number: 5,641,900
[45] Date of Patent: Jun. 24, 1997

[54] DEVICE FOR ANALYSIS OF TIRE GROUND CONTACT PRESSURE

[75] Inventors: Carlo Di Bernardo; Federico Mancosu, both of Milan, Italy

[73] Assignee: Pirelli Coordinamento Pneumatici S.p.A., Milan, Italy

[21] Appl. No.: 469,821

[22] Filed: Jun. 6, 1995

[30] Foreign Application Priority Data

Jun. 9, 1994 [IT] Italy ................................ MI94A1204

[51] Int. Cl.$^6$ .......................... E01C 23/00; G01N 19/02
[52] U.S. Cl. ................................................. 73/146; 73/8
[58] Field of Search ................................. 73/146, 8

[56] References Cited

U.S. PATENT DOCUMENTS

| | | | |
|---|---|---|---|
| 4,095,464 | 6/1978 | Breedijk | 73/146 |
| 4,184,365 | 1/1980 | Webster | 73/146 |
| 4,331,030 | 5/1982 | Webster | 73/146 |
| 5,092,166 | 3/1992 | Wada et al. | 73/146 |

FOREIGN PATENT DOCUMENTS

| | | |
|---|---|---|
| 0453703 | 10/1991 | European Pat. Off. . |
| 0545641 | 6/1993 | European Pat. Off. . |
| 2121283 | 8/1972 | France . |
| 3411584 | 10/1985 | Germany . |

*Primary Examiner*—Richard Chilcot
*Assistant Examiner*—William L. Oen
*Attorney, Agent, or Firm*—Watson Cole Stevens Davis, P.L.L.C.

[57] ABSTRACT

The distribution of a specific pressure in the ground-contacting area of a tire (4) under examination is detected by means of a plurality of sensing cells (7) distributed on a plate-like support (8) applied to a rest surface (2) acted upon by the tire through its rolling surface (5). Each sensing cell (7) sends an electric signal correlated with the specific pressure applied thereto to a processing unit (10) through which the processed signals are sent to a display device (12) graphically representing the distribution of the specific pressure in the ground-contacting area. By causing the tire (4) to roll on the rest surface (2) and therefore the sensing cells (7), the dynamic variation of the specific pressures in the ground-contacting area can be detected. A protection sheet (11) interposed between the rolling surface of the tire (4) and the sensing cells (7) protects the latter against risks of damages due to tangential shearing stresses produced at the ground-contacting area.

18 Claims, 3 Drawing Sheets

DEVICE FOR ANALYSIS OF TIRE GROUND CONTACT PRESSURE

BACKGROUND OF THE INVENTION

The present invention relates to a device for detecting the distribution of a specific pressure in the ground-contacting area of a motor-vehicle tire. The device is of the type comprising: a rest surface, actuator means for bringing the tire under examination to act, by its rolling surface, in a thrust relationship against the rest surface, and detection means operatively interposed between the tire and the rest surface to detect and display the distribution of the specific pressure in the ground-contacting area of said rolling surface on the rest surface.

The invention also pertains to a method carried out by said device for detecting the distribution of a specific pressure in the ground-contacting area of a motor-vehicle tire.

It is known that each tire has a rolling surface, usually defined by a tread band engraved according to a specific pattern, by which contact between the tire and the road-bed occurs. More particularly, contact between the ground and rolling surfaces takes places according to a so-called ground-contacting area, at which all of the forces resulting from vertical loads applied to the wheel are discharged to the ground, as well as tangential efforts generated by the effect of the driving torque or braking torque applied to the wheel itself and by effect of thrusts generated while the vehicle is running.

Usually, the load distribution in the ground-contacting area is never homogeneous. In fact even under static conditions, in the ground-contacting area different regions having different specific-pressure values can be identified, which values can vary, the load carried by the tire axis being equal, depending on a variety of factors such as the configuration of the tread pattern and the mechanical and structural features of the individual components in the tire. In any case, the modalities according to which the distribution of the specific pressures takes place in the ground-contacting area affects many of the functional features of the tire to a great degree, such as sensitivity to the aquaplaning phenomenon, roadholding, wear evenness in the tread band, braking stability, etc.

Therefore, it is important to know the distribution of the specific pressures in the ground-contacting area in order to be able to properly intervene, during the planning step, in the construction features of the tire, the selection of the materials used in making the tire, the selection of the tread pattern and all other factors that may affect such a distribution, in order to give the tire the desired functional features.

In this connection, the methods that have been hitherto known for detection of the specific-pressure distribution essentially consist in identifying the different surface portions of the tread that, following deflection undergone by the tire under load, come into contact with the rest surface of the tire: the value of the corresponding specific pressure is evaluated from the deformation undergone by the tread pattern or the color intensity of the foot prints left by the elements of said tread (ribs and/or blocks) on an appropriate contrast element.

For example, according to a well-known method which has been used for a long time even if only utilizable under static test conditions, the tire is brought to act with a predetermined load, on a flat rest surface, upon interposition of a carbon-paper sheet overlying a white paper sheet, on which the morphology of the ground-contacting area is thus reproduced. More particularly, blackening produced by carbon-paper on the white paper sheet at each point of the ground-contacting area will be much more marked as the specific pressure acting on that point is greater.

In this manner it is possible to achieve a visual representation of the distribution of the specific pressures in the ground-contacting area under static test conditions.

According to a different detection method, to be applied to the tire in motion as well, as described in U.S. Pat. No. 4,095,464, the tire under examination is pressed with a predetermined load, both in an immobilized condition and in motion, against a sheet of glass covered with a colored contrast liquid: on the sheet of glass an image of a black color is produced at the surface of the tread elements directly in contact with the glass and an image of another contrasting color at the voids of the tread pattern, that is at the hollows and at the fins or lamellae. The image thus created is photographed from the side of the free surface of the sheet of glass, by a light-sensitive means having a high definition and sensitivity, thereafter the photographed image thus obtained is optoelectrically converted to an electric signal representative of the tread image under load and said electric signal is compared with a similar reference signal, relating to the discharged tire, thereby drawing therefrom indications on the deformation value of the tread and the specific pressure applied thereto.

All the above means lack precision, are not very reliable and are often very expensive.

SUMMARY OF THE INVENTION

According to the present invention it has been found that if a plurality of sensing cells distributed according to a predetermined geometrical scheme and arranged to emit electric signals are correlated with the pressure stress applied thereto, are disposed as the detection means on the rest surface, it is possible to achieve, with the aid of an electronic processing unit operatively connected to the sensing cells, a much more reliable, accurate and efficient detection of the specific pressure than the one achieved by the known methods. In addition, the detection can be carried out not only under static conditions, but also under dynamic conditions that is by causing the tire to roll on a rest surface (which must not be necessarily flat, but may also be curved) so as to reproduce the operating conditions occurring during the actual use of the tire.

In greater detail, the invention relates to a device for detecting the distribution of the specific pressure in the ground-contacting area of a motor-vehicle tire, characterized in that it comprises: a plurality of sensing cells distributed in mutual closely spaced relationship according to a predetermined geometrical order and fixedly anchored to a plate-like support applied to said rest surface, each of said sensing cells being arranged to produce an electric signal correlated with a pressure stress applied thereto; an electronic processing unit connected in circuit with each of said sensing cells for receiving and processing the electric signals sent from said cells following the action exerted on the cells themselves by the rolling surface of the tire; display means operatively interconnected with the electronic processing unit for displaying, based on the signals arriving at said unit from the sensing cells, the distribution of the contact pressure between the rolling surface and the plate-like support at the ground-contacting area can be measured.

According to the invention, the present detection device further comprises: movement means for making the tire roll on the rest surface; a memory unit associated with the processing unit for storing the signals supplied from the sensing cells at different instants during rolling of the tire on the plate-like support; said display means being operable by the electronic processing unit for displaying the distribution of the specific pressure with reference to each of said instants in the ground-contacting area.

Also provided is the presence of at least one protection sheet made of a flexible material which is resistant to shearing stresses and operatively interposed between the rolling surface of the tire and said sensing cells in order to achieve a double objective: that of protecting said cells from tangential shearing stresses transmitted from the rolling surface at the ground-contacting area and that of eliminating the effect of said shearing stresses on the detected specific pressure.

Advantageously, the protection sheet is, with the rolling surface to a friction coefficient, the value of which is between 0.20 and 0.60, capable of ensuring separation of the sheet from the tire at the exit of the ground-contacting area without, on the other hand, enabling slippings of the rolling surface with respect to the rest surface.

Preferably, the protection sheet is made of a reinforced plastics material, such as for example metallized polyethylene.

The protection sheet may be fixed relative to the rest surface, even along only two opposite edges of the sheet that extend parallel to the tire axis.

In a preferential embodiment, each of said sensing cells has a substantially square configuration and has a surface area included between 9 and 49 square millimeters.

Conveniently, the rest surface is formed on a support plate movable according to a rectilinear direction perpendicular to the tire axis for causing rolling of the tire in a contact relationship on the rest surface itself.

Said rest surface can be also defined on the peripheral surface of known rotating drums which are part of tire test machinery or even on a road-bed travelled over by a motor-vehicle equipped with the tire under examination.

Another object of the present invention is a method for detecting the distribution of a specific pressure on the ground-contacting area of a motor-vehicle tire, said method comprising the following steps: arranging on a rest surface, a plurality of sensing cells distributed in an orderly manner and disposed in side by side relation with respect to each other, each of them being designed to emit an electric signal correlated with a pressure stress applied thereto; stressing the sensing cells through a tire under examination having a rolling surface acting in a thrust relationship on the sensing cells, at a ground-contacting area thereof; detecting the electric signals emitted by the individual sensing cells; processing said electric signals; displaying the distribution of the specific pressures at the ground-contacting area based on the processed electric signals.

Advantageously, such a method may also comprise the steps of: moving the tire and the rest surface in a mutual rolling relationship; storing the data obtained from processing of the electric signals detected at different instants during the mutual movement of the tire and rest surface; displaying, based on the stored data, the distribution of the specific pressures selectively in the ground-contacting area with reference to each of the different instants of the detection.

In a preferential embodiment the superposition of at least one protection sheet of a flexible material resistant to tangential shearing stresses is provided to protect the sensing cells arranged on the rest surface, said protection sheet being interposed between the cells and the rolling surface of the tire in order to withstand tangential shearing stresses generated by the rolling surface itself in the ground-contacting area.

Advantageously, said detection and storing steps are sequentially repeated during the mutual movement of the tire and the rest surface at a frequency not higher than 4000 Hz.

Displaying of the specific pressures can conveniently take place by graphic representations according to isolevel areas based on a grey scale or a color scale, or according to two- or three-dimension diagrams.

BRIEF DESCRIPTION OF THE DRAWINGS

Further features and advantages will become apparent from the detailed description of a preferred embodiment of a device for detecting the distribution of a specific pressure in the ground-contacting area of a motor-vehicle tire and the detection method carried out by said device according to the present invention, given hereinafter by way of non-limiting example with reference to the accompanying drawings, in which.

DETAILED DESCRIPTION OF PREFERRED EMBODIMENTS

Figure 1:
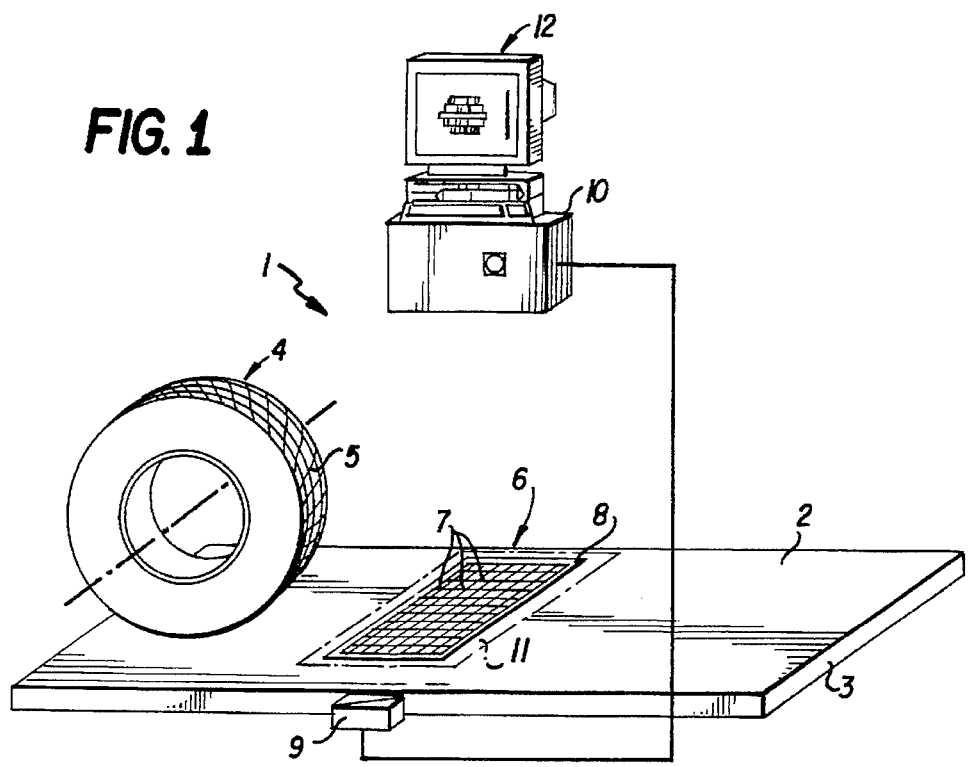
FIG. 1 diagrammatically shows the main components of the present invention.

Referring to the drawings, a device for detecting the distribution of the specific pressure in the ground-contacting area of a motor-vehicle tire according to the present invention has been generally identified by reference numeral 1.

The device 1 is comprised of a rest surface 2, formed for example on a rigid support plate 3, with which an actuator means (not shown and known per se and conventional) is combined, through which a tire 4 under examination, mounted to an appropriate rim (not shown) and inflated to a predetermined pressure is positioned with its rolling surface 5 in thrust relationship against the rest surface itself.

It will be apparent that, alternatively, said support plate 3 may also be part of the peripheral surface of a rotating drum, such as in the well known roller test bench interlocked to a motor driving the same in rotation according to predetermined speed and acceleration values varying within a wide range, and to a tire mounting device enabling the tire to be pressed against the roller test bench at predetermined load values, camber angles and slip angles.

Finally, said support plate may also be inserted into the surface of the road-bed, in the path traveled by the vehicle equipped with the tire under examination.

The contact between the rolling surface 5 of the tire 4 and the rest surface 2 takes place, in a manner known per se, through a so-called "ground-contacting area" at which the forces applied to the tire 4 are discharged onto the support plate 3 thereby giving origin, at the various points of the surface extension of the ground-contacting area itself, to a distribution of specific pressures the features of which, the operating conditions of the tire being equal, locally vary depending on the different features of the tire itself.

The device 1 further comprises detection means, generally identified by 6, adapted to act in an operating interposition relation between the rolling surface 5 and the rest surface 2 for detecting said distribution of the specific pressures in the ground-contacting area produced by the tire 4 under given test conditions.

According to the invention, such detection means 6 comprises a plurality of sensing cells 7 disposed in coplanar relation with each other and distributed according to a predetermined geometrical configuration, designed each to emit an electric signal having a value correlated with the pressure applied thereto. In greater detail, the sensing cells 7 can consist for example of piezoelectric sensors of a conventional type or preferably of resistors each conveniently made up of a pair of plate-like elements of an electrically conductive rubber material, overlying each other and exhibiting wrinklings on their mutually facing surfaces. When a potential difference is established between the two plate-like elements a current passage is generated through the sensing cell 7, which current passage grows correspondingly with the increasing of the pressure force acting on the plate-like elements, as a result of the increase of the mutual contact area between said wrinkled surfaces.

The resistors of the above type are commercially available under the trade name "Force Sensing Resistor" from Interlink Electronics.

In a preferred embodiment, said cells 7 have a surface area of between 9 and 49 $mm^2$. In greater detail, the sensing cells 7 can conveniently have a substantially square configuration a side of which measures between 3 and 7 mm, and is for example 5 mm, and are disposed in a coplanar side by side relation and in mutual alignment, on a plate-like support 8 fastened to the rest surface 2, by gluing for example.

Interconnecting conductors between the individual sensing cells 7 and a common terminal 9 may be formed on such a plate-like support 8, for example in the form of a printed circuit, said terminal 9, in turn, connecting the sensing cells to an electronic processing unit generally denoted by 10.

Preferentially, said electronic processing unit comprises two distinct portions not shown and known per se and usual, the first of which is only used to store data from the sensing cells 7, processing of said date being, on the contrary, carried out at a subsequent moment by the second portion of said unit since this work may require a much longer time than detection. In this manner it is possible to carry out a complex series of subsequent detections, the frequencies of which may be about 4000 Hz, thereby obtaining detection of the almost instantaneous variation in the specific pressure acting on the ground-contacting area during the tire rolling.

Figure 2:
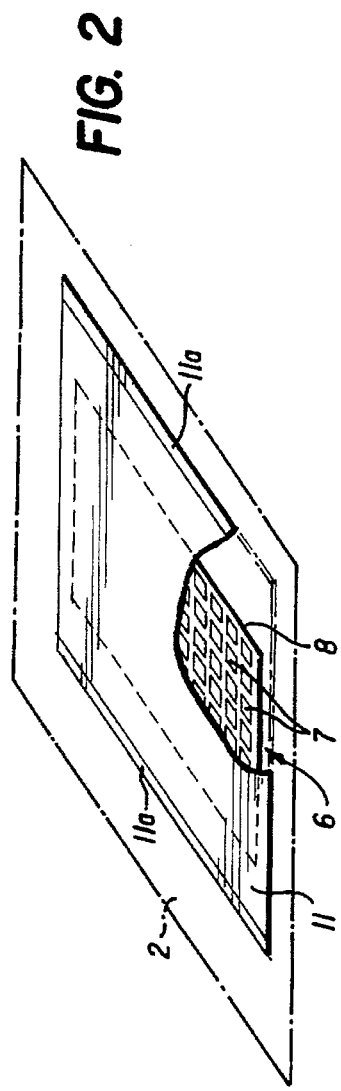
FIG. 2 is a perspective view, to an enlarged scale with respect to FIG. 1, of the plate-like support for the sensing cells and the protection sheet of said cells, according to the provision of a preferred embodiment of the invention.

According to a further feature of the invention, provision is also made for the presence of at least one protection sheet 11 (FIG. 2) of a flexible material to resist any shearing stresses and which is disposed between the rolling surface 5 of the tire 4 and the sensing cells 7, which protection sheet achieves the dual goal of eliminating the influence exerted by the tangential shearing stresses, transmitted from the rolling surface of the tire, on the pressure value detected by the sensing cells and protecting said cells from the mechanical effect of said stresses.

In greater detail, the protection sheet 11 is preferably made of a conveniently reinforced plastic material, metallized polyethylene and has a modulus of elasticity (Young's modulus) of between 1500 and 4000 $kg/mm^2$, which in the case of said metallized polyethylene is about 2505 $kg/mm^2$.

The presence of a protection sheet 11 makes it advantageously possible to examine the distribution and variation of the specific pressures in the ground-contacting area of the tire 4 even under dynamic conditions, that is during the tire rolling on the rest surface 2 at a given speed, without damages to the sensing cells 7 being caused by the shearing stresses generated tangentially of the ground-contacting area due to the deformations undergone by the tread pattern blocks defined in the rolling surface 5. Said dynamic conditions may be created by movement means consisting of one or more stepping motors operatively interconnected with the support plate 3 to cause a movement of said plate in a direction perpendicular to the axis of the tire 4 mounted idlely on its rotation axis, said movement being under control of the processing unit 10.

Alternatively, as already seen, such dynamic conditions are created in the laboratory, with the use of the roller test bench or directly on the road by driving the vehicle over the support plate provided with the detection sensing cells.

Advantageously, fastening of the protection sheet 11 to the rest surface 2 is carried out only along two opposite edges 11a of the sheet, oriented parallel to the tire 4 axis. In this manner, the protection sheet 11 has the possibility of sliding on the plate-like support 8 of the sensing cells 7 in order to follow the slight elastic deformations that are likely to be undergone by the protection sheet, also by effect of the longitudinal efforts generated by the resisting torque or, alternatively, the driving torque transmitted by the tire 4.

Obviously the protection sheet 11 may also be secured, by gluing for example, over the whole periphery thereof.

It is also provided that the plastic material selected for making the protection sheet 11 should give origin, with the rolling surface 5, to a friction coefficient the value of which is capable of ensuring, under dynamic conditions, the separation from the tire 4 and an easy detachment therefrom at least at the exit of the ground-contacting area, without however permitting slippage of the rolling surface with respect to the contact surface 2.

In this connection the value of said friction coefficient may be conveniently between 0.20 and 0.60.

During the use of the device 1 the electric signals emitted by the individual sensing cells 7 are sent to the electronic processing unit 10 and preferably stored in the form of a file in an appropriate memory unit coupled with the processing unit itself, not shown and known and conventional.

Subsequently the processing unit 10 processes the files stored in said memory unit in order to be able to give a graphic and/or numerical representation of same according to the requirements of the system.

Should the examination of the ground-contacting area be executed under static conditions, it is sufficient that data obtained from processing of the signals sent from the sensing cells 7 stressed by the tire 4 being tested under given conditions (inflation pressure, applied load, camber angle, etc.) be stored into a single file that will contain the information relating to the distribution of the specific pressures under said test conditions.

Should the tire be, on the contrary, examined under dynamic conditions, the signals simultaneously sent from the sensing cells 7, moment by moment according to a given sequence, while the tire 4 is passing over the sensing cells themselves, are stored in corresponding files each containing the information relating to the distribution of the specific pressures at a given test execution moment.

As in the case of the test under static conditions, such files are processed subsequently by the electronic processing unit.

Also associated with this electronic processing unit is display means 12, consisting for example of a conventional monitor and/or a printer, adapted to display, based on the signals arrived at the processing unit from the sensing cells 7, the distribution of the specific contact pressure at the ground-contacting area of the tire.

It is clear that, even if not shown in detail, the signals emitted by the processing unit can be used to control other operating units, for example indexing, adjustment and control means acting on the tire or the production process, in addition to or in place of the display means.

Advantageously, displaying can be carried out in different ways depending on the precise requirements.

Figure 3:
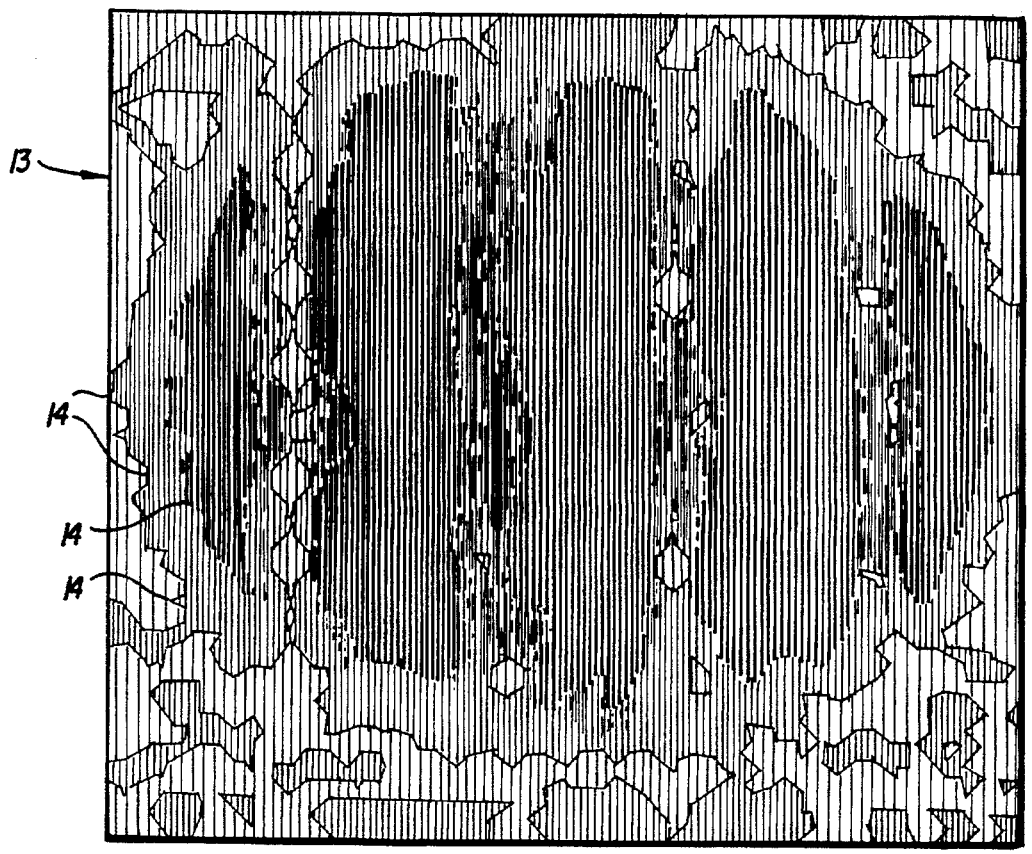
FIG. 3 is a graphic embodiment according to the method of the isolevel areas based on a grey scale, according to which the distribution of the specific pressures detected on the ground-contacting area of the tire under examination is displayed in black and white, the grey scale is represented by areas of line shading wherein increased density of line shading represents darker shades of grey.

One way consists in giving a graphic representation in black and white by isolevel areas based on a grey scale. In greater detail, as shown in FIG. 3, such a graphic representation generally identified by 13, is comprised of a plurality of regions or pixels, each corresponding to one of the sensing cells 7. The contiguous pixels in which one and the same specific pressure value has been detected are enclosed in an area 14 colored in grey or another color, the intensity of said color being proportional to said value of the specific pressure.

In the example shown the higher the value of the specific pressure detected in the corresponding sensing cells 7, the more coloring of regions 14 and hence such regions will tend to become black.

Therefore such a graphic representation enables an operator to verify at a glance whether the distribution of the specific pressure in the ground-contacting area of the tire is homogeneous or concentrated in given zones.

It is to be noted that, according to the present invention, the grey or selected contrast color intensity represents the pressure value really and directly read on the ground-contacting area under examination and not, as in the usual detection methods, the effect of said pressure on an intermediate means such as the carbon-paper ink or the contrast liquid. In other words, from the grey shade detectable in the different zones of the graphic representation it is possible to go back to the exact value of the specific pressure present in the corresponding zones of the ground-contacting area. This possibility is not offered by the above traditional detection methods which exclusively enable a qualitative general evaluation of the distribution of the specific pressure on the area but not a quantitative evaluation, that is the exact measurement of the amount thereof.

Figure 4:
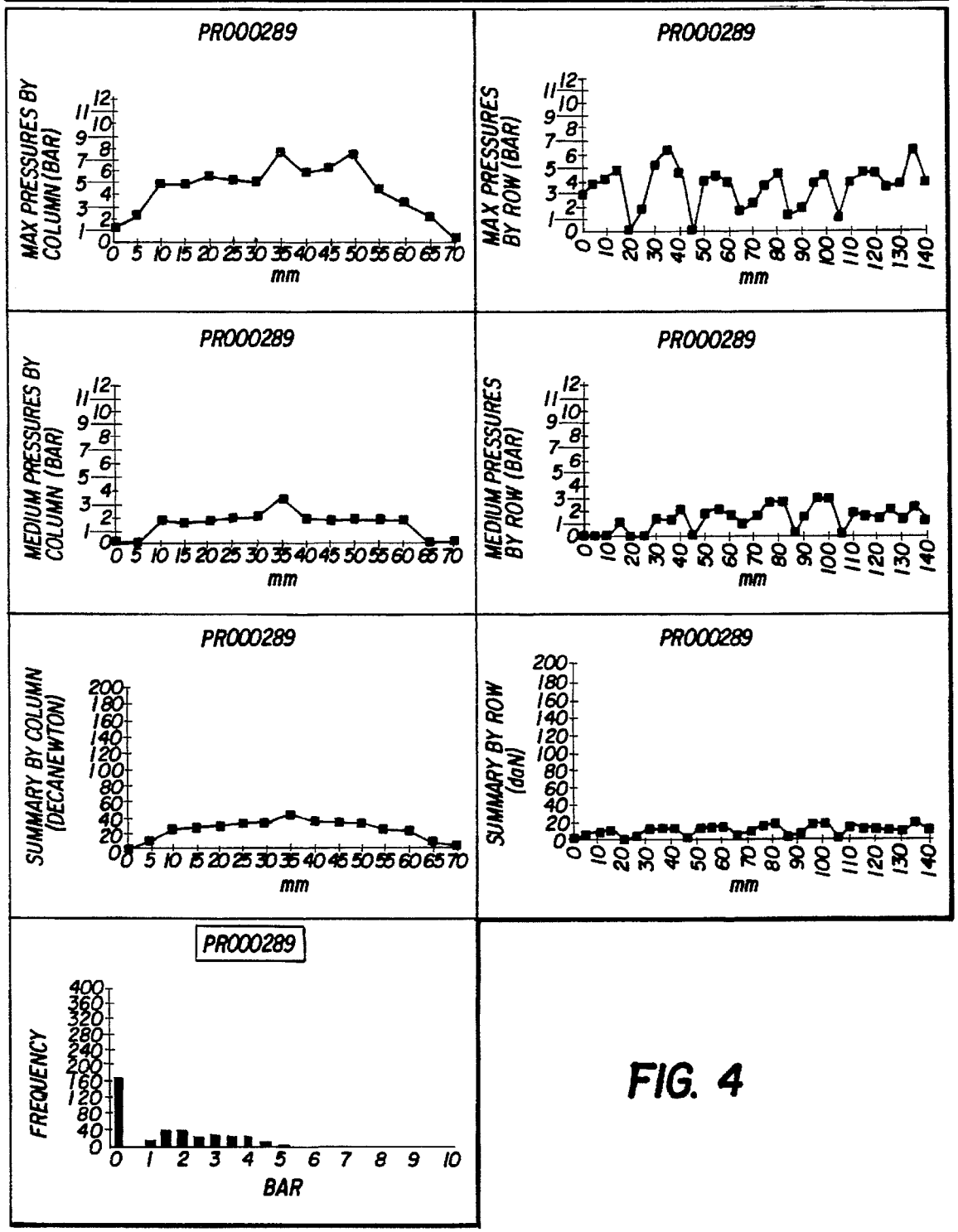
FIG. 4 shows a second graphic representation according to the method of the two-dimension diagrams by which the instantaneous-pressure values along a circumferential line and a transverse line of the tread are reproduced in a Cartesian axis system.

Shown in FIG. 4 is another convenient way for graphically representing the specific acting pressure and it consists in reproducing the values detected at a given section, generally along a circumferential or transverse line of the tread, in a Cartesian axis system, thereby obtaining a pressure diagram referring to a given moment along said circumferential or transverse lines.

Figure 5:
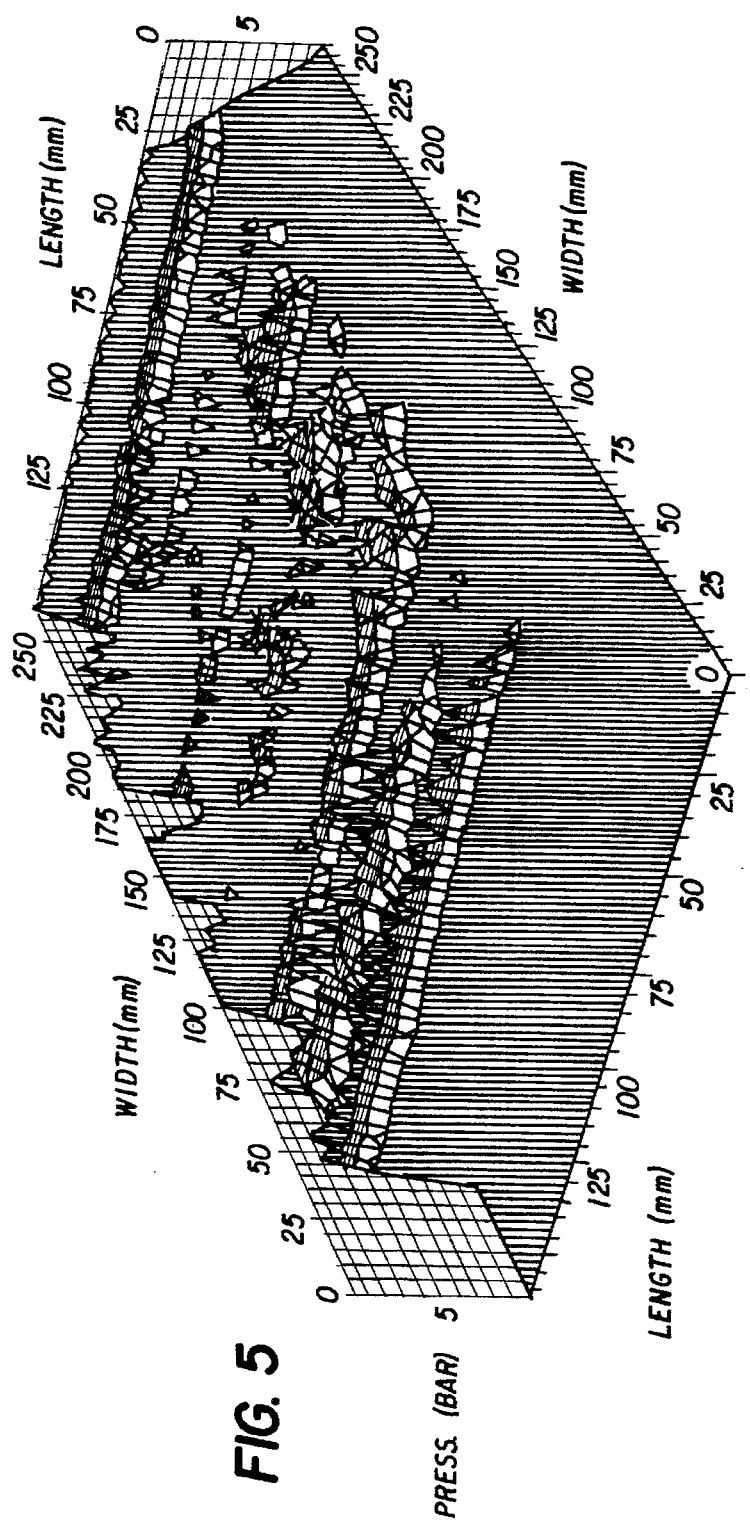
FIG. 5 shows a third graphic representation of the distribution of the specific pressures detected in the ground-contacting area of the tire under examination, according to which each pressure value is reproduced on the vertical axis of a three-axis Cartesian system, thus achieving a three-dimension view of said specific pressures.

A graphic representation of immediate comprehension for clarity and visual form is the one shown in FIG. 5, where the pressure values at a precise moment of detection are reproduced on the vertical axis of a triad of Cartesian axes thereby giving origin, in combination with the pattern of the ground-contacting area shown in the plane of the two other axes, to a three-dimension cusp-like figure representative of the pressure at the ground-contacting area at that given moment, wherein the height of the different cusps is also more highlighted by a change of color with the increasing of said height.

It is to be noted that the execution of the tests under dynamic conditions, that is while the tire is being moved, and therefore the graphic representation of the distribution of the specific pressures in the ground-contacting area, has been achieved by virtue of the possibility of an instantaneous detection of the signals produced by the sensing cells 7: this result cannot be achieved by traditional methods utilizing a carbon-paper both because the shearing forces generated from the rolling surface during the movement would cause tearing of the underlying sheets, and because, even if the sheets should withstand the shearing stresses, the image transferred from the carbon-paper would correspond to a pressure distribution over the ground-contacting area characterized by the maximum value reached at each point by pressure at that very point while the tire is rolling.

It is also noted that, according to a preferred embodiment of the invention, detection of the electric signals emitted by the individual sensing cells is advantageously executed at a high frequency, although preferentially not higher than 4000 Hz.

The great amount of data consequently stored in relation to the distribution of the specific pressures at the many instants during which detection is carried out makes it possible to go back, by the graphic representations corresponding to each of the instantaneous detections, to the dynamic variation of the specific pressure occurring at each point of the rolling surface over the whole period of time elapsing between entry and exit of said point to and from the ground-contacting area.

The above result could not be previously achieved, even by adopting the most sophisticated detection systems, such as those disclosed in the above mentioned U.S. Pat. No. 4,095,464.

It is apparent from the foregoing that the present invention, in addition to greatly improving the analysis of the specific-pressure distribution under static conditions as compared to the known art, surprisingly makes it possible to check in a precise and immediate manner the dynamic specific-pressure variations that occur under test conditions corresponding to the real operating conditions provided for the tire under examination.

In this connection, the present invention can be carried out directly in relation to tires mounted to a vehicle, using as the rest surface the road-bed on which the vehicle is caused to run.

Therefore during the planning step the research for technical solutions and expedients aiming to optimize the behavior features of the tire is greatly facilitated. In fact, by virtue of the present invention, it is possible to check in an immediate manner whether or not a given expedient adopted in manufacturing the tire under examination results in improvements in the specific-pressure distribution under dynamic conditions.

Obviously, many modifications and variations may be made to the invention as conceived without departing from the scope of the invention as claimed in the appended claims.

We claim:

1. A device for detecting the distribution of a contact pressure in the ground-contacting area of a motor-vehicle tire, comprising:

a rest surface;

actuator means for bringing a tire under examination to act, by its rolling surface, in a thrust relationship against said rest surface;

detection means operatively interposed between the tire and the rest surface to detect the pressure in the ground-contacting area of said rolling surface on the rest surface;

a plurality of sensing cells distributed in mutual closely spaced relationship according to a predetermined geometrical pattern and fixedly anchored to a plate-like support applied to said rest surface, each of said sensing cells being arranged to produce an electric signal correlated with a pressure stress applied thereto;

interconnecting conductors for connecting each of said individual sensing cells with a common terminal;

an electronic processing unit connected to said common terminal for receiving and processing said electric signals from said cells, said unit comprising a memory for storing said electric signals before they are processed;

display means operatively interconnected with said electronic processing unit for displaying the distribution of the contact pressure at the ground-contacting area between the rolling surface and the sensing cells.

2. A device according to claim 1 further comprising:

movement means for causing the tire to roll on the rest surface;

said memory unit being connected to the processing unit for storing the signals supplied from the sensing cells at different instants during rolling of the tire on the plate-like support;

said display means being operable by the electronic processing unit for displaying the distribution of the specific pressure in the ground-contacting area, selectively with reference to each of said instants.

3. A device according to claim I comprising at least one protection sheet made of a flexible material resistant to shearing stresses and operatively interposed between the rolling surface of the tire and said sensing cells for protecting said cells from tangential shearing stresses transmitted from the rolling surface at the ground-contacting area and to eliminate the effect of said shearing stresses on the specific pressure detected on said area.

4. A device according to claim 3 in which said protection sheet gives rise to a friction coefficient the value of which is capable of ensuring separation of the sheet from the tire at the exit of the ground-contacting area and also inhibiting slippings of the rolling surface with respect to the rest surface.

5. A device according to claim 4 in which said protection sheet results in a friction coefficient of between 0.20 and 0.60.

6. A device according to claim 3 in which said protection sheet is made of a reinforced plastic material.

7. A device according to claim 6 in which said protection sheet is made of metallized polyethylene.

8. A device according to claim 3 in which said protection sheet is fixed to the rest surface along two opposite edges thereof extending parallel to the tire axis.

9. A device according to claim 1 in which each of said sensing cells has a substantially square configuration.

10. A device according to claim 1 in which one of said sensing cells has a surface area of between 9 and 49 mm$^2$.

11. A device according to claim 2 in which said rest surface is formed on a support plate movable along a rectilinear direction perpendicular to the tire axis for causing rolling of the tire in a contact relationship on said rest surface.

12. A device according to claim 2 in which said rest surface is defined on the peripheral surface of a rotating drum associated with a tire test machine.

13. A device according to claim 2 in which said rest surface is defined on a road-bed traveled over by a motor-vehicle equipped with the tire under examination.

14. A method for detecting the distribution of a specific pressure on the ground-contacting area of a motor-vehicle tire, comprising the following steps:

arranging on a rest surface, a plurality of sensing cells distributed in an orderly manner and disposed in side by side relation with respect to each other, each of said sensing cells being designed to emit an electric signal correlated with a pressure stress applied thereto;

interconnecting conductors for connecting each of said individual sensing cells with a common terminal;

stressing the sensing cells by means of a tire having a rolling surface acting in a thrust relationship on the sensing cells, at a ground-contacting area thereof;

detecting the electric signals emitted by said sensing cells to said common terminal;

processing said electric signals;

displaying the distribution of the specific pressures at the ground-contacting area based on the processed electric signals.

15. A method according to claim 14 further comprises the steps of:

moving the tire and the rest surface in a mutual rolling relationship;

storing the data obtained from processing of the electric signals detected at different instants during the mutual movement of the tire and rest surface;

displaying, based on the stored data, the distribution of the specific pressures selectively in the ground-contacting area with reference to each of the different instants of the detection.

16. A method according to claim 14 in which displaying of the specific pressures takes place by a graphic representation according to isolevel area based on a color scale.

17. A method according to claim 14 including superimposing of at least one protection sheet of a flexible material resistant to tangential shearing stresses for defense of the sensing cells arranged on the rest surface, said protection sheet being interposed between the cells and the rolling surface of the tire in order to withstand tangential shearing stresses generated by the rolling surface in the ground-contacting area and eliminate the effect of said shearing stresses on the detected specific pressure.

18. A method according to claim 15 including sequentially repeating said detection and storing steps during the mutual movement of the tire and the rest surface at a frequency not higher than 4000 Hz.

* * * * *